March 9, 1954  H. W. HAPMAN  2,671,561
SEDIMENT COLLECTION AND REMOVAL APPARATUS
Original Filed Oct. 12, 1944  2 Sheets-Sheet 1

Inventor
Henry W. Hapman
Barthel + Bugbee
Attorneys

March 9, 1954

H. W. HAPMAN 2,671,561

SEDIMENT COLLECTION AND REMOVAL APPARATUS

Original Filed Oct. 12, 1944

Inventor
Henry W. Hapman
Barthel & Bugbee
Attorneys

By

Patented Mar. 9, 1954

2,671,561

UNITED STATES PATENT OFFICE 2,671,561

SEDIMENT COLLECTION AND REMOVAL APPARATUS

Henry W. Hapman, Kalamazoo, Mich., assignor of forty per cent to Hannah Jane Hapman, Kalamazoo, Mich.

Original application October 12, 1944, Serial No. 558,424, now Patent No. 2,559,614, dated July 10, 1951. Divided and this application November 15, 1950, Serial No. 195,846

3 Claims. (Cl. 210—52)

The present invention relates to improvements in coolant tanks, and more particularly, to a sludge removing and filtering apparatus therefor.

The primary object of the invention is to provide a coolant and sludge tank in which the coolant liquid is circulated therethrough in such a manner as to be freed from foreign particles and to provide means for removing said particles and filtering the coolant liquid to purify the same for recirculation to the source of use.

Another object of the invention is to provide a coolant tank and sludge collection system for accommodating a large number of machine tools in order to collect the coolant liquid and sludge therefrom after being used to cool the machine and work so that said coolant liquid and sludge may be conveyed to the coolant tank for purification, separation and recirculation.

Another object of the invention is to provide a sludge collection system for a series of machine tools in which the coolant liquid is supplied thereto by means of pressure feed from the coolant tank and returned to the tank by gravity and conveyor means to insure the proper cleaning of the circulatory system and the collection and separation of sludge and other foreign matter from the coolant liquid.

Another object of the invention is to provide a coolant tank for accommodating a large number of machine tools in which the coolant liquid is collected in the tank and filtered before being returned to the system in such a manner as to free the coolant liquid of all impurities and foreign matter and convey said foreign matter to a remote point externally of the tank for disposal.

Another object of the invention is to provide a system for coolant liquids used or employed for cooling various machine tools and the like in which the means for conveying the liquid and sludge to the coolant tank consists of an endless conveyor trained over sprockets or pulleys and arranged in a conduit in such a manner as to remove all of the sediment and sludge from the conduit and convey the same to the coolant tank.

In the drawings:

Figure 3 is a top plan view of one of the sprockets or rollers interposed in the sludge collecting system for guiding the conveyor thereof about its circuitous pathway;

Figure 4 is a vertical cross-sectional view taken on line 4—4 of Figure 3, looking in the direction of the arrows and further showing the manner in which the sprocket or roller for guiding the conveyor is mounted in the floor of the plant.

Figure 1:
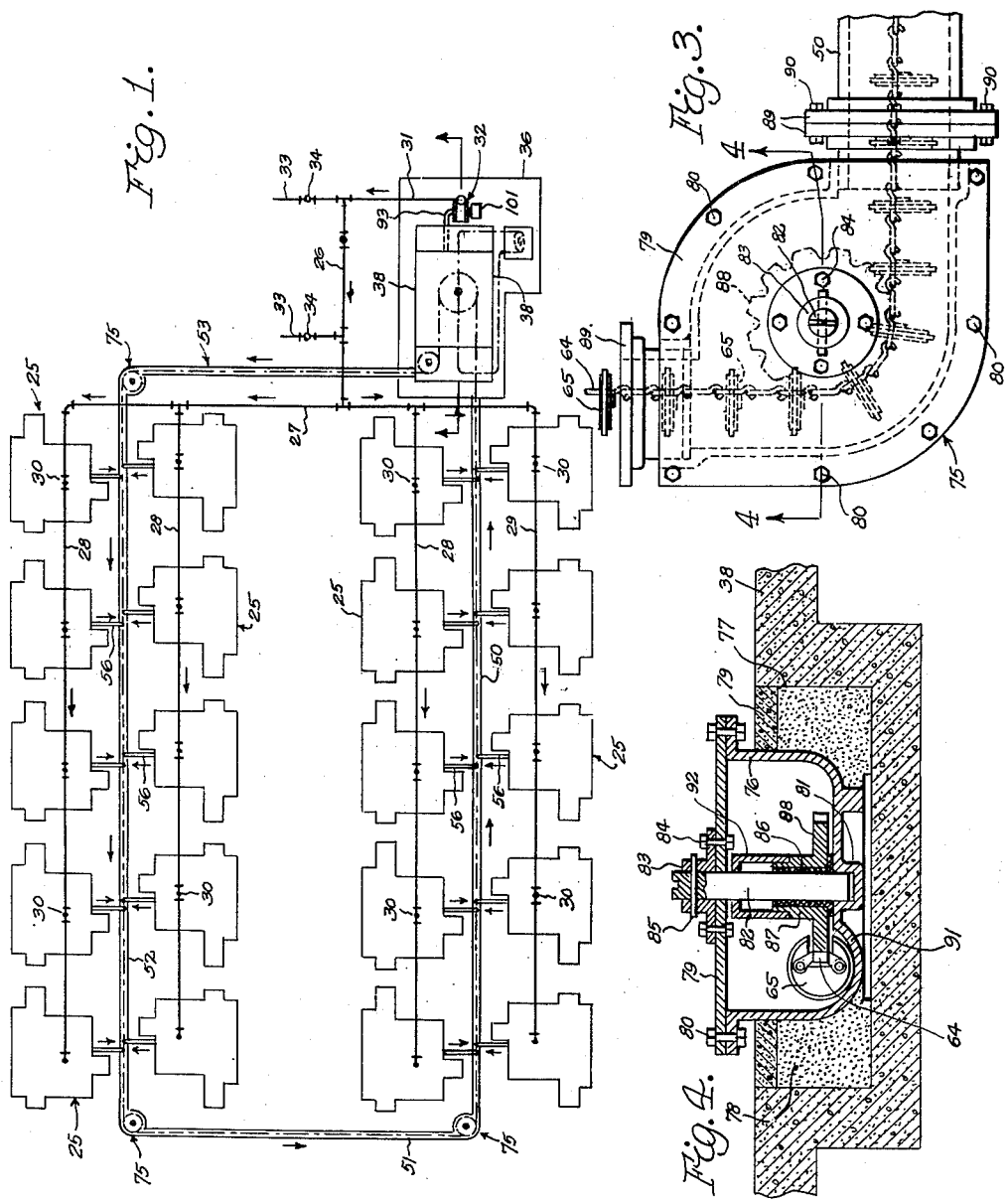
Figure 1 is a diagrammatic view of one form of the invention showing a coolant supply and sludge collection system for accommodating a plurality of machine tools.
Figure 2:
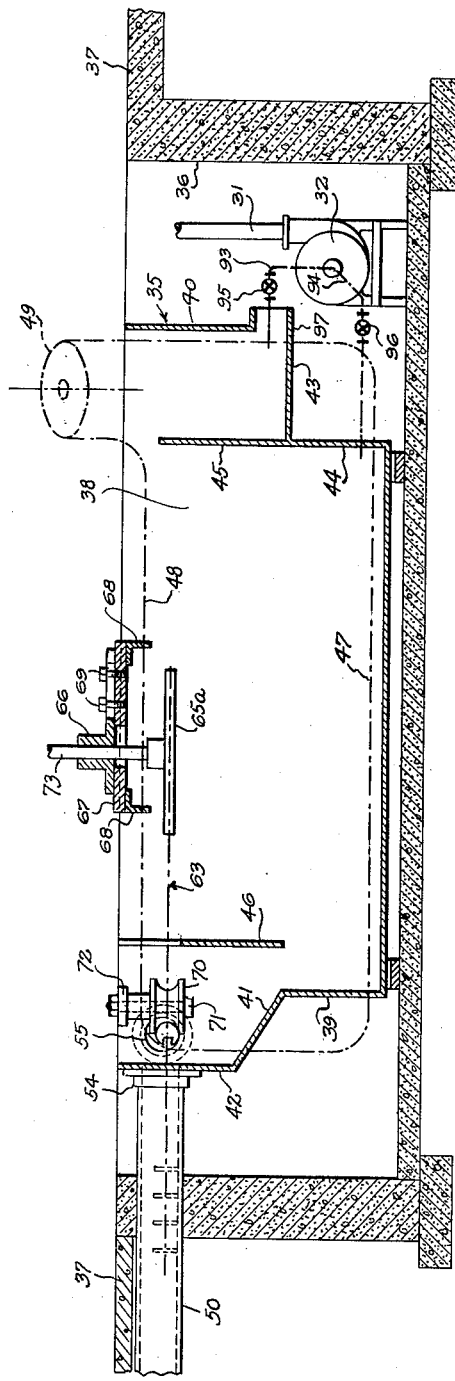
Figure 2 is a vertical cross-sectional view of the coolant tank and sludge removal and disposal means employed in the form of the invention shown in Figure 1 illustrating the manner in which the tank is mounted below the floor level to permit the gravity return of the coolant liquid from the machine tools.

Referring to the drawings in detail Figures 1 and 2 show one form of the invention in which a coolant tank has been adapted to a system for accommodating a plurality of machine tools so as to feed cooling liquid thereto and permit the liquid after being used to be discharged into a common trough or conduit through which is passed an endless conveyor for aiding in conveying the liquid back to the coolant tank, as well as removing sediment therefrom which may become deposited on the walls of the conduit or trough. In industrial machine plants and factories employing a large number of machine tools, it is necessary to handle the cooling liquid in such a manner as to service all of the machine tools so as to save as much of the cooling liquid as possible, and as illustrated in Figure 1, a series of machine tools 25 are arranged in parallel rows spaced a sufficient distance to permit the operator of each machine tool freedom of movement in the execution of his duties and operation of the machine. The machine tools 25 such as lathes, grinders, shapers and other tools for metal, composition and fiber are supplied with a cooling medium through a feed pipe 26 which is connected to a manifold pipe 27 having a series of branch pipes 28 which extend above the machine tool 25 so that suitable connections may be had with the branch pipes 28 for directing a jet of cooling liquid over the surface of the work and machine tool during operation. Each of the branch pipes 28 is provided with a valve fitting 30 to interrupt the flow of cooling liquid to any one of the machine tools 25 which is out of operation for the purpose of repairs or otherwise. The feed pipe 26 is connected to a feed line 31 which is connected to the discharge or exhaust of a rotary fluid pump generally indicated by the reference character 32 and said feed pipe 26 is also provided with an additional pipe line 33 which may connect with other manifold pipes and branch pipes similar to the manifold and branch pipes 27 and 28 respectively. Suitable valves 34 are interposed in the additional pipe lines 33 to control the flow of liquid therethrough to other systems similar to the one shown.

The coolant liquid or settling tank is generally indicated by the reference character 35 and is mounted below the floor level in a pit 36 formed in the floor 37 of the factory or plant in a location convenient and readily accessible to the machine tools 25.

The coolant or settling tank 35 includes side walls 38 connected at the ends by suitable end walls 39 and 40 and the end wall 39 is offset and provided with a sloping portion 41 to form a collection chamber having a wall 42. The wall 40 likewise is offset by means of a horizontal wall portion 43 which connects with a vertical wall portion 44 as indicated in Figure 2, and said end wall 44 projects upwardly to form a division or baffle wall 45, and similarly, the baffle wall 46 is mounted at the opposite end of the coolant tank so as to prevent the material being discharged therein from being dispersed, and to direct the same downwardly toward the inclined sloping bottom walls of the tank, thereby forming a trough 47.

An endless sediment-removal conveyor 48 is mounted with respect to the coolant tank 35 so that a horizontal course thereof will traverse the trough-shaped bottom wall portion 47 and remove sludge therefrom. The conveyor 48 is trained over the drive sprocket 49 which is drivingly connected to a suitable motor or other power source. The conveyor 48 may pass along the trough-shaped bottom portion 47 of the coolant tank and may pass out one end thereof so as to extend laterally and upwardly, and thence horizontally by means of suitable tubing, terminating at the sprocket wheel 49. Another section of conveyor tubing may then be passed downwardly at an inclined angle for attachment to the vertical wall 44 of the coolant tank in registry with an opening therein so that the endless conveyor and flight will traverse the trough-shaped bottom portion 47 and remove sludge therefrom as well as other foreign matter and particles.

Figure 5:
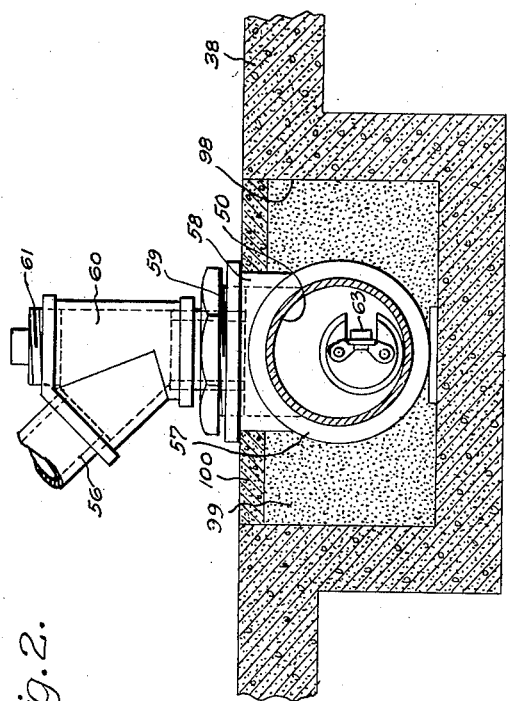
Figure 5 is a vertical cross-sectional view of a union connecting the machine discharge of one of the machine tools with the conveyor conduit.

In order to collect and return the coolant liquid from the machine tools 25, a circuitous sediment collection conveyor conduit structure in the form of a trough is imbedded in the floor 37 and extends between certain rows of machine tools 25 and the coolant tank 35. This conveyor conduit structure (Figure 1) includes a first portion 53 extending from the coolant tank 35 to the first row of machine tools 25, a second portion 52 extending from the first portion 53 past the first row of machine tools 25, a third portion 51 extending from the second portion 52 to the second row of machine tools 25, and a fourth portion 50 extending from the third portion 51 past the second row of machine tools 25 back to the coolant tank 35. The conveyor conduits or troughs have their straight-line portions 50 and 53 connected to the coolant tank 35 by suitable couplings 54 and 55 extending through the end wall 42 and side walls 38 respectively, and the discharge pipe 56 from each machine tool 25 is connected to the conveyor conduit of one of the straight parallel sections 50 and 52 so that the coolant liquid discharged from the machine tools will flow by gravity to the conveyor conduit 50 or 52. At spaced intervals along the parallel conveyor conduits 50 and 52 there is provided a series of pipe couplings or unions 57 having laterally extending ported bosses 58 suitably threaded and machined for receiving the screw-threaded portion 59 of a Y-connection 60 (Figure 5). One of the passages of the Y-connection is adapted to be connected to the discharge pipe 56 while the other passage extends at right angles to the conveyor conduit 50 or 52 to facilitate the cleaning of said conduit at various intervals and the repair of the conveyor flights carried by the conveyor chains. The uppermost end of the Y-connection 60 is open and is adapted to be closed by a screw plug 61 which is readily accessible and easily removed for the purpose of gaining access to any of the conveyor parts of the endless conveyor.

The sediment-collection conveyor is generally indicated by the reference character 63 and said conveyor comprises an endless chain 64 having a series of conveyor flights 65. A drive sprocket 65a (Figure 2) is provided for driving the endless conveyor 63 and is mounted in an adjustable bearing 66 on a suitable platform 67 supported by angle bars or brackets 68 extending between the side walls of the coolant tank 38. The adjustable bearing 66 is held in place by bolts or the like 69 which extend through the slotted opening in said adjustable bearing and have their ends threaded or otherwise secured in the platform 67. In order to guide the endless conveyor 63 as it passes from the coolant tank through the bushing 55, a guide pulley 70 is supported on a short spindle 71 arranged and supported by a bracket arm 72 secured to one of the side walls 38 of the coolant tank 35 so that the groove of the roller 70 will be in alignment with the conveyor passageway 53. The conveyor 63 enters the coolant tank through the bushing 54 which is tangentially aligned with the periphery of the drive sprocket 65a so that said sprocket may drive the conveyor 63 when power is applied to the shaft 73 thereof by means of an electric motor or other source of power.

In order to guide the sediment-collection conveyor 63 in such a manner as to negotiate the turn between the parallel portions 50 and 52, guide pulleys 75 are arranged at proper locations so that the conveyor will travel a course extending between as many pairs of rows of machine tools as may be desired. The pulley means 75 includes a sector-shaped casing 76 (Figures 3 and 4) which is located in a floor recess 77 in the floor 38 and sealed therein by suitable packing material covered by a relatively thin layer of concrete 79a or the like. The pulley housing 76 is provided with a removable cover 79 fastened in place by bolts or the like as at 80, and the floor of the pulley housing 76 is provided with a bearing boss 81 for receiving the lower end of a shaft 82. The upper end of the shaft 82 is secured to a bushing 83 affixed to the cover or top wall 79 by bolts or the like as at 84 and a locking pin 85 extends through the shaft 82 and bushing 83 to prevent relative rotation thereof. Mounted on the shaft 82 is a bushing 86 to provide a bearing surface for the hub 87 of a sprocket or pulley wheel 88 which is adapted to drive the conveyor chain 64 and extend into the opening of the conveyor flights (Figures 3 and 4).

The straight-line portions of the conveyor conduit are connected to the pulley housing 76 by complementary flanges 89 which are bolted together by suitable circumferentially spaced anchoring bolts 90. The bottom wall of the pulley housing is shaped to form a conveyor trough 91 extending from the inlet thereof to the outlet in an arc about the pulley or sprocket wheel 88 so that the level of the coolant liquid will be maintained below the sprocket wheels 88 when the conveyor 63 is operated, preferably at a speed such that the coolant liquid level will not be elevated during operation. In order to protect the bushing 86 and shaft 82 against the action of abrasive material, a cover sleeve 92 encircles a portion of the shaft 82 and is slidably fitted over a reduced portion of the hub 87. It is to be understood that the pulley means 75 for guiding the endless conveyor in its circuitous pathway are identical in construction and so a description of one as pointed out in Figures 3 and 4 will suffice for all.

The intake of the feed pump 32 is provided with a pair of branch pipes 93 and 94 (Figure 2) which are connected to different portions of the coolant tank 35 and may alternately be used by operation of the control valves 95 and 96 respectively. The intake pipe 93 is connected to a pipe fitting or projection 97 in the end wall 40, and similarly, the intake pipe 94 may be connected to the lowermost portion of the tank by a similar fitting or connection secured to the wall 44 of said tank.

It is to be noted that the pipe unions 57 are mounted in the floor 38 of the industrial plant or factory in a manner similar to the pulley housing 76 and as shown in Figure 5, they are located in recesses or depressions 98 which are filled with packing material 99 and covered with a relatively thin layer of concrete or other plastic material as at 100. This arrangement and construction permits easy access to each pipe union to facilitate repair thereto in the same manner as pointed out in connection with the pulley or sprocket housing 76 in Figures 3 and 4.

An electric motor or the like as at 101 is provided for driving the rotary pump 32 and said motor may be mounted on the floor of the pit 36 in side by side relationship with the pump 32 so that the shaft thereof may be conveniently and drivingly connected to the motor.

If desired, the conveyor conduits or troughs 50 and 51, 52 and 53 may be inclined so as to induce the flow of coolant liquid to the coolant tank 35 by gravity. In the event that rectangular troughs are employed instead of circular or tubular conduits, the conveyor flights 65 may be formed of a suitable shape and size to conform to the cross-sectional shape of said troughs so as to engage the walls thereof and facilitate the removal of sludge or other foreign matter collecting in said conveyor trough or conduit. In the present structure, as shown in Figure 1 to 5 inclusive, wherein the conveyor conduits or passageways 50, 51, 52 and 53 are level, a certain portion of the coolant liquid will drain back to the coolant tank 35 to seek a lower level therein due to the presence of liquid head pressure in the stand pipes 56 and the fact that the conveyor flights are of a smaller diameter than the diameter of the conveyor conduits or passageways 50, 51 and 52, 53.

This application is a division of my co-pending application Serial No. 558,424 filed October 12, 1944 for Apparatus for Conditioning, Cleaning and Circulating Coolant Liquid, which has since become Patent No. 2,559,614 granted July 10, 1951.

What I claim is:

1. A liquid collection and distribution system for removing sediment from liquid circulating to and from a plurality of machines having liquid supply and discharge pipes, said system comprising a settling tank, a circuitous sediment collection conveyor conduit structure extending from machine to machine and having an inlet communicating with the discharge pipe of each of said machines, said conveyor conduit structure having an outlet disposed at and discharging into said tank, an endless sediment-collection conveyor mounted in said conveyor conduit structure and having one portion extending therethrough and another portion extending past said outlet at said tank whereby to collect sediment-bearing liquid and discharge the same into said tank, a separate sediment-removal conveyor spaced apart from said sediment-collection conveyor and having a portion thereof disposed below said sediment-collection conveyor and extending along the bottom of said tank for removing the sediment settling downward in said tank, and a pumping system having a feed pipe extending from said tank to said supply pipes for pumping the purified liquid from the upper portion of the tank to the supply pipes of said machines after the removal of the sediment therefrom.

2. A liquid collection and distribution system for removing sediment from liquid circulating to and from a plurality of machines having liquid supply and discharge pipes, said system comprising a settling tank, a circuitous sediment-collection conveyor conduit structure extending from machine to machine and having an inlet communicating with the discharge pipe of each of said machines, said conveyor conduit structure having an outlet disposed at and discharging into said tank, an endless sediment-collection conveyor mounted in said conveyor conduit structure and having one portion extending therethrough and another portion extending past said outlet at said tank whereby to collect sediment-bearing liquid and discharge the same into said tank, a separate sediment-removal conveyor spaced apart from said sediment-collection conveyor and having a portion thereof disposed below said sediment-collection conveyor and extending along the bottom of said tank for removing the sediment settling downward in said tank, and a pumping system having a feed pipe extending from said tank to said supply pipes for pumping the purified liquid from the upper portion of the tank to the supply pipes of said machines after the removal of the sediment therefrom, said conveyor conduit structure and said settling tank being positioned below the level of the floor supporting said machines.

3. A liquid collection and distribution system for removing sediment from liquid circulating to and from a plurality of machines having liquid supply and discharge pipes, said system comprising a settling tank, a circuitous sediment-collection conveyor conduit structure disposed approximately in a horizontal plane, said conduit structure extending from machine to machine and having an inlet communicating with the discharge pipe of each of said machines, said conveyor conduit structure having an outlet disposed at and discharging into said tank, an endless sediment-collection conveyor mounted in said conveyor conduit structure and having one portion extending therethrough and another portion extending past said outlet at said tank whereby to collect sediment-bearing liquid and discharge the same into said tank, a separate sediment-removal conveyor spaced apart from said sediment-collection conveyor and having a portion thereof disposed below said sediment-collection conveyor and extending along the bottom of said tank for removing the sediment settling downward in said tank, and a pumping system having a feed pipe extending from said tank to said supply pipes for pumping the purified liquid from the upper portion of the tank to the supply pipes of said machines after the removal of the sediment therefrom.

HENRY W. HAPMAN.

References Cited in the file of this patent

UNITED STATES PATENTS

| Number | Name | Date |
|---|---|---|
| Re. 22,789 | Brunner | Sept. 10, 1946 |
| 602,515 | McClatchey et al. | Apr. 19, 1898 |
| 1,455,187 | Brown | May 15, 1923 |
| 1,615,833 | Gelstharp et al. | Feb. 1, 1927 |
| 2,432,756 | Hapman | Dec. 16, 1947 |
| 2,556,182 | Hapman | June 12, 1951 |
| 2,559,614 | Hapman | July 10, 1951 |